United States Patent [19]

Yamada et al.

[11] Patent Number: 4,945,384
[45] Date of Patent: Jul. 31, 1990

[54] SCANNING-MEMBER-STOP POSITIONING DEVICE FOR THE IMAGE FORMING APPARATUS

[75] Inventors: Syuji Yamada, Hyogo; Hironori Andou, Osaka, both of Japan

[73] Assignee: Mita Industrial Co., Ltd., Osaka, Japan

[21] Appl. No.: 317,193

[22] Filed: Feb. 28, 1989

[30] Foreign Application Priority Data

Mar. 1, 1988 [JP] Japan ................................. 63-49114

[51] Int. Cl.⁵ ...................... G03B 27/48; G03B 27/50; G03B 27/70
[52] U.S. Cl. ........................................ 355/51; 355/57; 355/66; 355/235
[58] Field of Search .................... 355/51, 235, 236, 57, 355/66, 233

[56] References Cited

U.S. PATENT DOCUMENTS 4,693,595  9/1987  Kunikawa et al. .................. 355/235

FOREIGN PATENT DOCUMENTS 59321   3/1986  Japan ................................... 355/236
210442  9/1987  Japan ................................... 355/236

*Primary Examiner*—Richard A. Wintercorn
*Attorney, Agent, or Firm*—Koda & Androlia

[57] ABSTRACT

A scanning-member-stop positioning device for the image forming apparatus, wherein a document in contact with a document glass plate is exposed due to the movement of a scanning member consisting of an optical section or a document glass plate, will execute a precise braking control in which a suitable degree of the brake power determined by the actual run to stop the scanning member just at the home position. Accordingly the present invention should be characterized about what the brake power, started at the timing of the passage over the fixed position against the scanning member running back toward the home position in the fixed velocity, is changed the degree, and about what the suitable degree of the brake power is determined by operation corresponding to the moving distances given as a result of the change.

3 Claims, 5 Drawing Sheets

SCANNING-MEMBER-STOP POSITIONING DEVICE FOR THE IMAGE FORMING APPARATUS

BACKGROUND OF THE INVENTION

1. Field of the Invention

The present invention relates to a scanning-member-stop positioning device, controlling the degree of the brake power against a scanning member consisting of an optical section or a document glass plate so as to stop it exactly at the home position, for the image forming apparatus like a copying machine, a document reader, and so on.

2. Description of the Prior Art

A copying machine will be illustrated in FIG. 6 as an example in the background of the invention. Said copying machine scans a paper on a document glass plate 2 with the exposure on account of movement of the optical section 1 comprising a light source etc. on right and left. While such a exposure scanning can be done by a movement of the document glass plate 2 under condition of stopping the optical section 1. Accordingly, the optical section 1 or the document glass plate 2 should be called "a scanning member" generally in the present invention.

A copying machine A shown in FIG. 6 is a type of having a movable optical section 1 waiting before a copying operation at the left end in the figure, namely a home position denoted by a reference sign 1a in FIG. 6.

In being pushed a print key at the time of the copying operation, the optical section 1 will start moving in the right direction in FIG. 6. When the optical section 1 passes over a read starting position 1b illustrated with the dotted line, a detect piece 1' installed in the optical section 1 actuates a read starting positional sensor $SW_1$. The signal from said sensor $SW_1$ determines the start timing of rotating a resisting roller 4 which conveys a paper 8 to a photoreceiptor drum 3. The optical section 1, which passes over the read starting position 1b, moves up to a position (the maximum movement up to a position 1c) in proportion to the document sizes to be lighted out. After that, the optical section goes back to the home position 1a. Then the optical section 1 goes back and forth in the number of times being equal to the copy quantity between the home position 1a and the end position at the right end in FIG. 6 (such as a position 1c) so as to scan the document with the exposure. The toner image formed on the surface of the photoreceiptor drums 3 is transferred on the paper 8 sent out by the resisting roller 4, and is fixed by a fixing roller 5. After that, the paper 8 is conveyed out on a copy tray 6.

The scanning member consisting of the above-mentioned optical section 1 or the document glass plate 2 in itself comprises some heavy parts such as the light source and its frame. Therefore the scanning member and the casing main body of the copying machine are deteriorated their durability by a gross load originated in a sudden stop of the scanning member at the home position 1a. For the purpose of copying with the foregoings, the back-running scanning member is relieved its stop shock by the stepwise brake operation generally, said scanning member is decelerated at the timing of passage over the read starting position 1b further is braked more powerfully for the purpose of its stop at the home position 1a. And these arts should be referred to J.P. (KOKAI) No. 62-129837 and to J.P. (KOKAI) No. 60-62776.

As described above, the stopping method of the scanning member by the stepwise brake operation is superior to the suddenly stopping one with regard to the point relieving the shock. And it is commonly known that the required degree of the brake power should change with frictional registance arising from a movement of the scanning member, the environment of a room temperature etc., the historical factor and so on. In spite of the foregoing description, an adjustment of said degree of the brake power is not so much correct in the prior art.

SUMMARY OF THE INVENTION

The present invention was made to solve the conventional problems as mentioned above.

It is the general object of the present invention to execute a precise braking control in which a suitable degree of the brake power determined by the actual run to stop the scanning member just at the home position 1a.

Therefore a scanning-member-stop positioning device for the image forming apparatus, wherein a document in contact with a document glass plate is exposed due to the movement of a scanning member consisting of an optical section or a document glass plate, is provided, and characterized by comprising means for driving a scanning member to run back toward a home position in the appointed velocity, means for starting the braking of the scanning member under returning at the timing of passage over the appointed position, means for changing a degree of the brake power of the just-above-said means, and means for obtaining a suitable degree of the brake power based on the differential moving distance from the changed degrees of the brake power against the scanning member.

The meaning of a degree of the brake power should include a braking time and a braking torque on the inverted rotation brake, and a magnitude of the braking torque on the frictional brake hereinafter.

As for said scanning-member-stop positioning device, the scanning member consisting of an optical section or a document glass plate is driven back toward the home position in the appointed velocity by means for driving the scanning member. The scanning member under return will be braked by means for braking the scanning member at the timing of passage over the appointed position, for example, the read starting position. And the stop position of the scanning member will change according to the degree of the brake power at said timing.

On the way of back-running actuation, the serial process which includes the stopping state via the braking actuation as the foregoing description should be repeated twice at least. During said repetition, a means for changing the degree of the brake power changes the stop position of the scanning member, namely its moving distance. Further a suitable degree of the brake power is computed in accordance with the moving distance changed during above-stated repetition by said means for operating.

While the specification concludes with claims particularly pointing out and distinctly claiming the subject-matter of the invention, it is believed the invention will be better understood from the following description taken in connection with the accompanying drawings in which:

DETAILED DESCRIPTION OF THE PREFERRED EMBODIMENT

The copying machine possessing a movable optical section is adopted in a following embodiment of the invention. In this case, its brake power is determined owing to the invertion of a motor driving said optical section.

Figure 4:
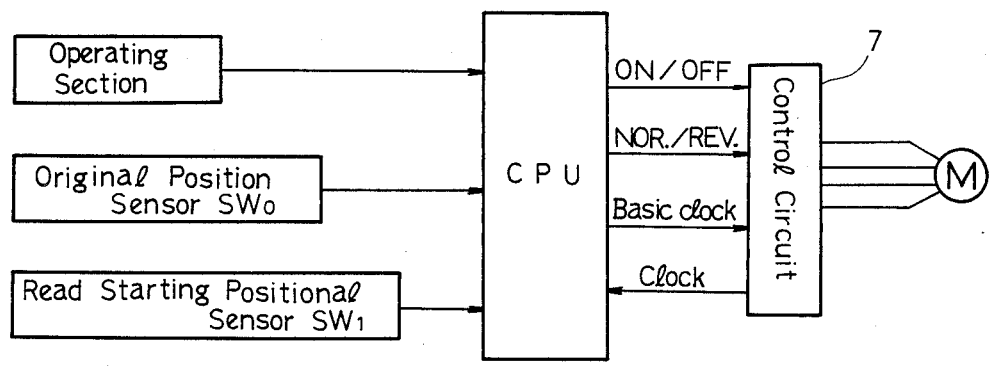
FIG. 4 is a block diagram of the signal circuit for said device being able to execute the procedure illustrated in FIG. 1, FIG. 2, and FIG. 3.
Figure 6:
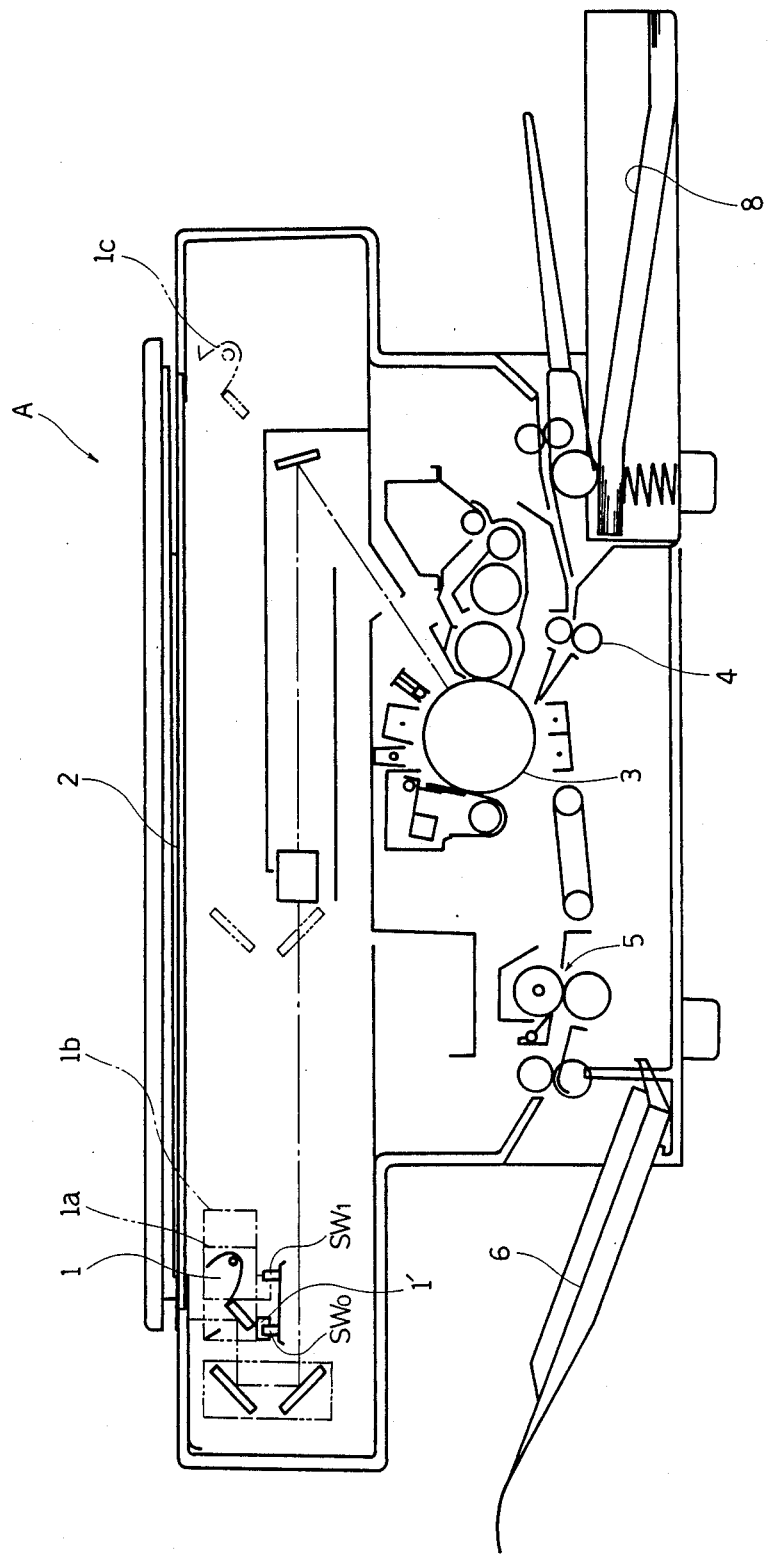
FIG. 6 is a schematic vertical sectional view of a conventional copying machine as a background of the invention.

As shown in FIG. 4, the motor M driving the optical section 1 rotates by means of a control circuit 7. The signals of ON/OFF, of normal/inverted rotation, and of standard clock (the clock driving the motor M at fixed speed) from a microprocessor CPU in the microcomputer are inputted in such a control circuit 7. On the other hand, the clock signal corresponding to the rotation numbers of the motor M is inputted from the control circuit 7 to CPU. And the signals from the operational section providing the operational keys, such as the print key, the copy quantity keys, the image density keys etc., from an original position sensor $SW_0$ detecting the arrival of the optical section 1 to its home position $1a$, and from a read starting positional sensor $SW_1$ are inputted to CPU. There upon the install locations of said original position sensor $SW_0$ and said read starting positional sensor $SW_1$ should be referred to FIG. 6.

Figure 1:
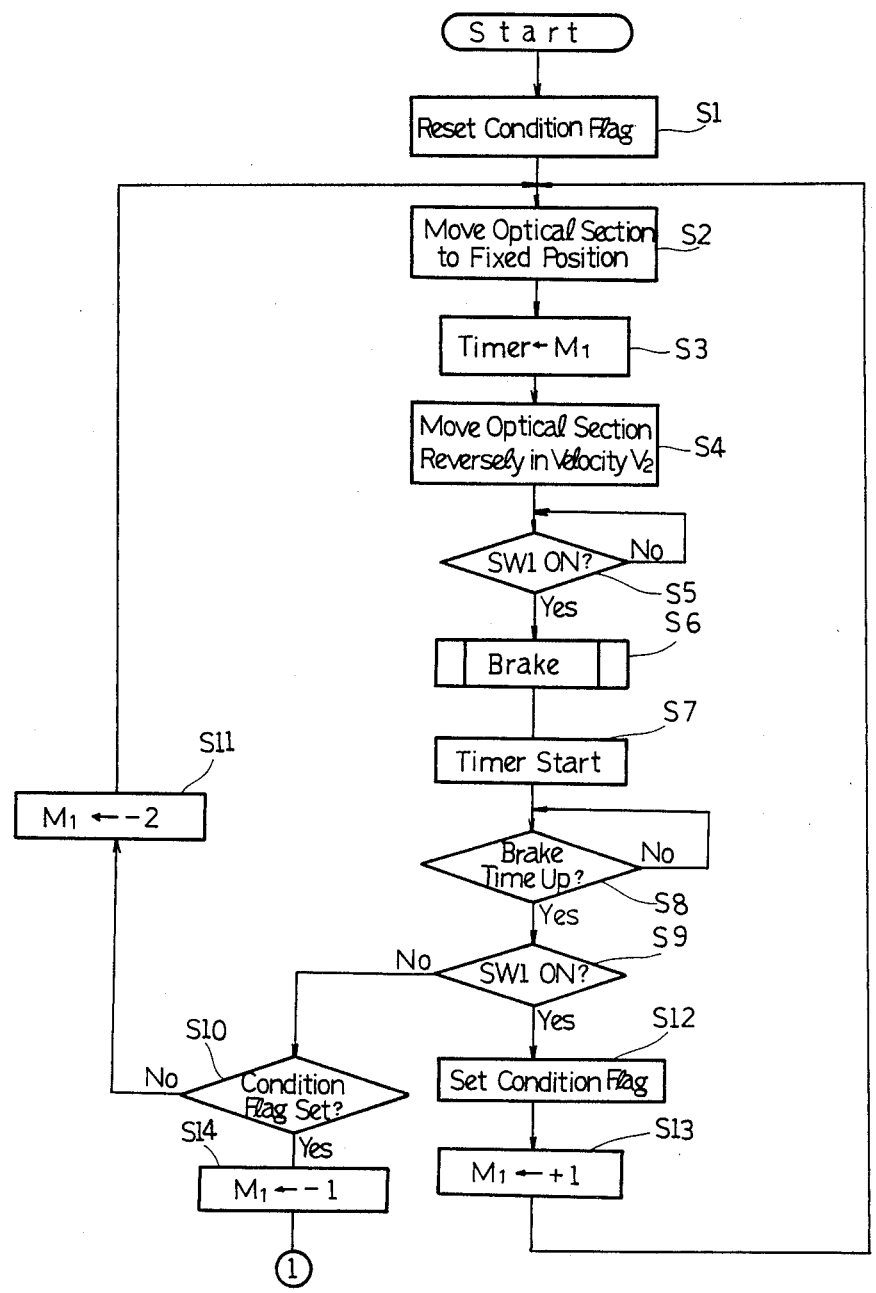
FIG. 1 and FIG. 2 are the serial flowsheets of the procedure for a scanning-member-stop positioning device according to an embodiment of the present invention.
Figure 2:
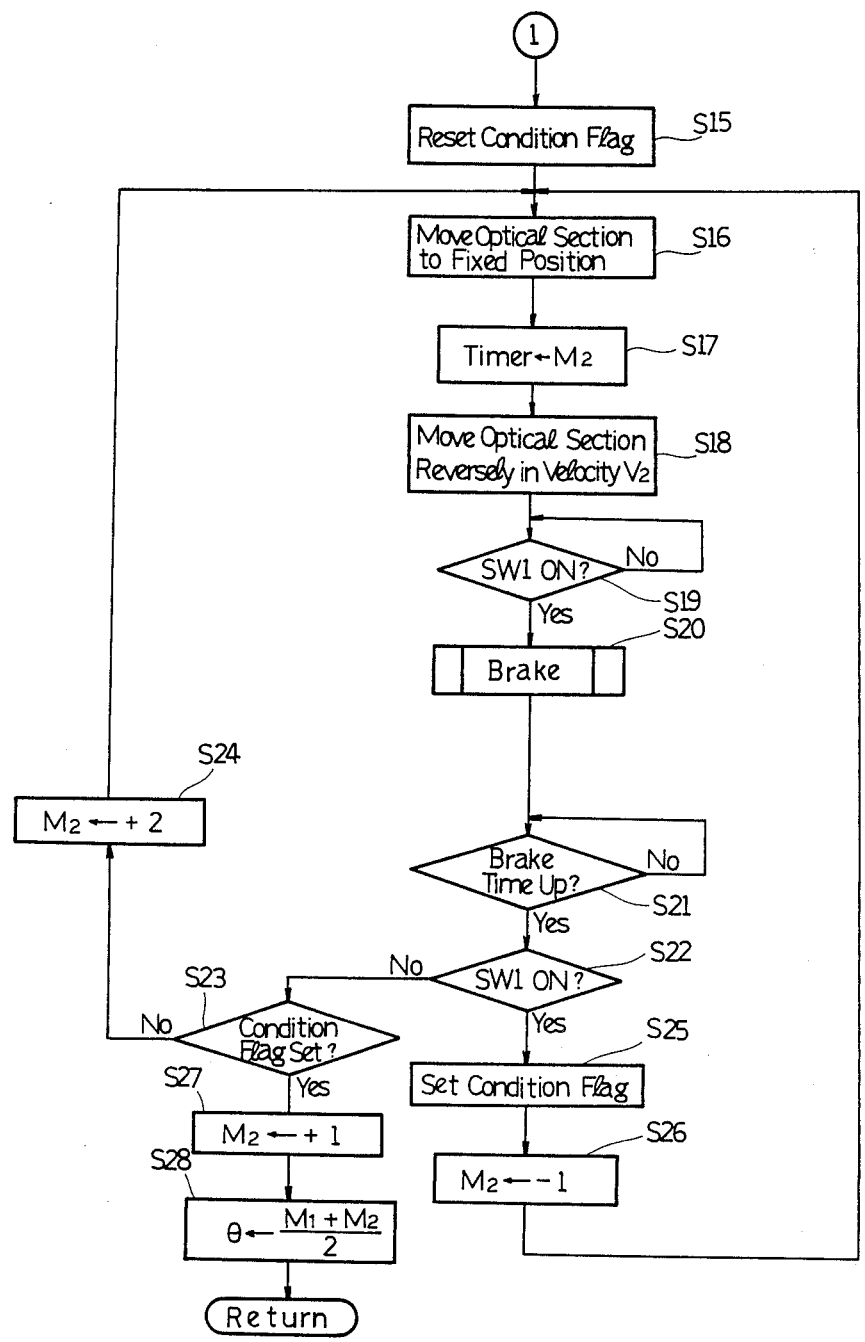
Figure 3:
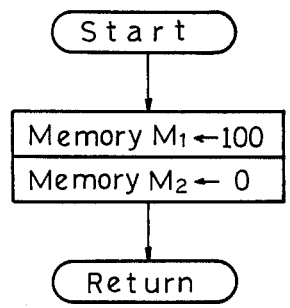
FIG. 3 is a flowsheet of the procedure initializing said device.

As follows, the embodied procedure will be explained by reference to the drawing from FIG. 1 to FIG. 3. Then, the steps on the procedure will be shown S1, S2, ... in the below-mentioned description.

The scanning-member-stop positioning mode will be started at the time of turning on the power switch or the check switch etc. in the copying machine A, for example, of a complete assembly examination, and of adjusting some parts of the machine just delivered to users. On starting the above-described procedure, firstly, two memories $M_1$, $M_2$ are initialized as shown in FIG. 3.

Memory $M_1$ initially memorizes the data value of the count number, e.g., a value of 100, corresponding to the braking time overestimated a little at the inverted brake. Memory $M_2$ initially is set up the data value of the count number, e.g., a value of 0, corresponding to the very smaller value than the suitable braking time. As shown in FIG. 1, condition flag is reset at the step S1 after the initialization said above.

Next, the optical section 1 is carried to the appointed preliminary-run-start position in accordance with S2. Said preliminary-run-start position is on the right of the read starting position $1b$ in FIG. 6. The optical section 1, running back (going left in the drawing) toward the home position $1a$ from the preliminary-run-start one in a appointed velocity, secures the minimum preliminary-run range required so as to pass in the velocity at the read starting position $1b$.

The presetted value in memory $M_1$ is set up to the timer in accordance with S3 when the optical section 1 reaches at the preliminary-run-start position. At once, the optical section 1 starts moving in the reversed direction (running back) in a velocity $V_2$ in accordance with S4. This velocity $V_2$ means one obtained when the optical section 1 braked at the read starting position $1b$ in the exposure scanning operation of ordinary use The optical section 1 running in the velocity $V_2$ is usually braked at the home position $1a$ so as to be stopped there. In the procedure as shown in this flowsheet, an actuating state of the optical section 1 from the read starting position $1b$ to the home position $1a$ is reappeared between the appointed preliminary-run-start position and the read starting position $1b$ and an optimum degree of the brake power on the second braking actuation can be determined.

Accordingly the detect piece $1'$ provided in the optical section 1 running back in the velocity $V_2$, contacts with the read starting positional sensor $SW_1$ soon after to turn it on (S5). At this time, the motor M starts rotating inversely for the brake (S6), and the timer starts counting (S7). The inverted rotation brake is released after the timer counts up to the presetted count at said S3 (S8). The read starting positional sensor $SW_1$ is judged herein whether it turns on (S9).

Figure 5:
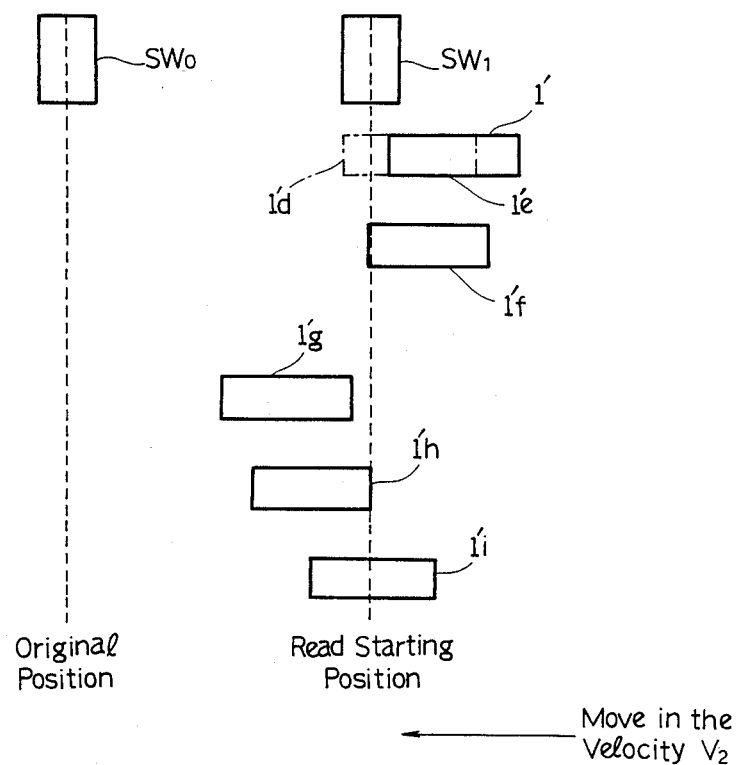
FIG. 5 is a conceptual view of the stop position of the scanning member according to the degrees of the brake power.

The foregoing states of the detect piece $1'$ are illustrated in FIG. 5. The optical section 1 is started braking by inversely rotation when the detect piece $1'$ provided in it passes by the read starting positional sensor $SW_1$. Therefore, the detect piece $1'$ goes forth again to such position as $1'e$ illustrated with the continuous line, owing to the inverted rotation brake to stop after reaching to a position $1'd$ illustrated with the one-dot chain line.

As mentioned above, it may be observed that the detect piece $1'$ goes forth again over the read starting positional sensor $SW_1$ due to a too great inverted rotation brake, corresponding to the initialized value of memory $M_1$. Then the read starting positional sensor $SW_1$ should be judged to be in OFF in accordance with S9. That is to say, it should be recognized that a braking time corresponding to the initially fixed degree of the brake power is too long. So the optical section 1 must be actuated again under the condition of the braking time shortened a little. In other words, the data value of memory $M_2$ is decremented by S2 (S11) by way of the judging step (S10) about a condition flag. And the process is returned to the step S2.

The procedures of the steps processed between S2 and S9 are repeated as the foregone while the braking time is decremented at every repetition. And the forth-going distance will decrease with the braking time decremented stepwise. In the long run, the front end of the detect piece $1'$ shown as a position $1'f$ in FIG. 5 will pass slightly over the detective line (a detecting position), illustrated the broken line, of the read starting positional sensor $SW_1$. The foregoing state is judged "Yes" in the step S9. The procedure is advanced to the step S12 on account of the judge in the step S9 being "Yes" in these conditions, and the condition flag is set up herein. Successively the procedures of the steps processed between S2 and S9 are repeated again after adding the value of 1 to the memory $M_1$ (S13). The adding process is made minutely to the value of memory $M_1$ much more with the object of a fine positioning of the optical section 1 than the rough subtracting one decreasing 2 in every S11. Hence the greater decrement value can be set up in the step S11 on condition that the operating efficiency will be increased.

The detect piece 1' passes over the detect position of the read starting positional sensor $SW_1$ before long on account of the fine positioning in the S13 and the procedure from S2 to S9 repeated no less than once, and said sensor $SW_1$ turns off. In these conditions, the judgement in the step S10 is shown "Yes", that is, the count number is overadded by 1. So the value of 1 is decreased from one of memory $M_1$ in the step S14. As mentioned above, the count value is computed corresponding to the braking time required for the optical section 1 to be stopped at the position $1'f$ where the front end of the detect piece 1' passes slightly over the detecting position of said sensor $SW_1$, and is stored in memory $M_1$.

In the present embodiment, the procedure on adjusting the braking time will be explained. And herein the braking time is adjusted for the optical section 1 to stop at the position where the center of its detect piece 1' conforms to the detecting position of the sensor $SW_1$, e.g., where its piece 1' is shown as $1'i$ in FIG. 5.

Accordingly the braking time to be necessary to stop the detect piece 1' at the position $1'h$ is computed in the following procedure shown in FIG. 2, and the procedure, which average the value of said braking time and one of the braking time stored in memory $M_1$, is made. In other words, the condition flag is reset to the initial state in the step S15 after the process of said S14 is finished. Continuously, the optical section 1 is made to go forth to the preliminary-run-start position (S16) appointed above. And the optical section 1 goes back in the appointed velocity $V_2$ (S18) after the value of memory $M_2$ is set to the timer (S17).

The inversely rotation brake against the optical section 1 is started (S20) when its detect piece 1' pass over the detecting position of the read starting positional sensor $SW_1$ (S19). And said brake continues for the appointed time set to the timer (S21).

Then the judgement on the ON/OFF state of the read starting positional sensor $SW_1$ is made at the stop position (S22). The degree of the brake power should be too low at this time because the minimum value is initially set to the value of memory $M_2$ as described above. Consequently the detect piece 1' shown as $1'g$ in FIG. 5 is made to stop on its rear end passing over the detecting position of the sensor $SW_1$. As a result, the judgement in the step S22 should be selected "No".

The condition flag is still in the reset state at the step S23 as well as at S15. So the increment of the count value of 2 is done to the value of memory $M_2$. The procedure from the step S16 to S22 is executed again. The stop position of the optical section 1 goes forth stepwise as the braking time for inversing the motor M becomes longer like the foregoing description. The rear end of the detect piece 1' provided in the optical section 1 comes upon barely the detecting position of the read starting positional sensor $SW_1$ by and by. At this time, the step S22 selects the judgement of "Yes", the condition flag is set up (S26), the value of memory $M_2$ is decreased by 1 (S26), and the procedure from the step S15 to S22 is processed again. The rear end of the detect piece 1' detaches again from the detecting position of the sensor $SW_1$ by means of the above-stated procedure repeated no less than once for a fine positioning. Further, the value of 1 is added again to one of memory $M_2$ in S27 after the step S22 judges "No".

Therefore the count value, corresponding to the braking time when the detect piece 1' is made to stop at the position shown as $1'h$ that the rear end comes upon barely the detecting position of $SW_1$, is stored into memory $M_1$. The average of the values of both the memories $M_1$, $M_2$ is computed in the following step S28, and is stored into memory 0. Hereabout the procedures should finish after all. The braking time, based on the value of memory 0 and referring to the signal from the original position sensor $SW_0$, is given on the ordinary copy operation hereafter.

In the preferred embodiment mentioned above, the center of the detect piece 1' provided in the optical section 1 will be made to stop at the position where the center of the detect piece 1' will be conformed to the detecting position of the read starting positional sensor $SW_1$. In case of the detect piece 1' of its arbitrary part made to stop at the detecting position of $SW_1$ as the other embodiment, the value, devided the added value of memory $M_1$ and $M_2$ in proportion to the optional ratio, may be adopted. And the start timing of the brake may be controlled on the signal of the alternative switch in stead of the read starting positional sensor $SW_1$.

The value of 100 or 0 is set comprehensively to memory $M_1$ or $M_2$ respectively in the preferred embodiment. However the proper values approximating to the actual braking time relatively can be selected inevitablly on account of raising the efficiency by means of the reduction of the repeating frequency. And the values extended properly can be initialized referring to the previous values in memories. In any case, a value is set to the memory $M_1$ or $M_2$, the process of the fine adjusting should be executed in the steps S12–S13, or S25–S26. As a result, the optimum braking time can be calculated certainly, nevertheless the process time is spent a little more. Though the stepwise subtractions are done from (or additions are done to) the value set in the memory $M_1$ as greater one (or set to memory $M_2$ as some smaller one) than an assumed braking time in the foregoing embodiment, the stepwise additions may be done little by little to some smaller value set to memory $M_1$ conversely, and the stepwise subtraction may be done from some greater value set to memory $M_2$ similarly.

By all accounts of the present invention as mentioned above, the brake power against the scanning member running back toward the home position $1a$ in the appointed velocity, started at the timing of its passage over the appointed position, is changed the degree. Further the suitable degree of the brake power is determined by operation corresponding to the moving distances given as a result of the change. Therefore the optimum degree of the braking power should be determined precisely in the actual stopping of the scanning member.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A scanning-member-stop positioning device for an image forming apparatus, wherein a document in contact with a document glass plate is exposed due to the movement of a scanning member consisting of an optical section or a document glass plate, said device comprising:
- means for driving a scanning member to run back toward a home position at a fixed velocity;
- means for applying braking power to the scanning member under return beginning to be braked at the timing of passage over a fixed position;
- means for changing a degree of braking power by said means for applying braking power; and
- means for selecting a suitable degree of braking power based on the moving distances of the scanning member from the changed degrees of braking power.

2. A device as claimed in claim 1 wherein said means for selecting a suitable degree of braking power comprises means for computing an average value of a maximum count data and a minimum count data.

3. A device as claimed in claim 1, wherein said means for selecting a suitable degree of braking power comprises means for computing a divided value in proportion to an optional ratio from the addition of a maximum count data and a minimum count data.

* * * * *